(12) United States Patent
Schubert et al.

(10) Patent No.: US 10,980,031 B2
(45) Date of Patent: Apr. 13, 2021

(54) COLLABORATIVE SIDELINK INTERFERENCE MANAGEMENT WITH BEAM SELECTION TECHNIQUE

(71) Applicant: Huawei Technologies Co., Ltd., Shenzhen (CN)

(72) Inventors: Martin Schubert, Munich (DE); Ali Ramadan, Munich (DE); Karthikeyan Ganesan, Munich (DE); Josef Eichinger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/786,567

(22) Filed: Feb. 10, 2020

(65) Prior Publication Data

US 2020/0314828 A1    Oct. 1, 2020

Related U.S. Application Data

(63) Continuation of application No. PCT/EP2017/070357, filed on Aug. 10, 2017.

(51) Int. Cl.
*H04W 72/04* (2009.01)
*H04W 72/08* (2009.01)

(52) U.S. Cl.
CPC ....... *H04W 72/046* (2013.01); *H04W 72/082* (2013.01)

(58) Field of Classification Search
CPC .......................... H04W 72/046; H04W 72/082
USPC ................ 455/452.1, 422.1, 418, 454, 464
See application file for complete search history.

(56) References Cited

U.S. PATENT DOCUMENTS

| | | | |
|---|---|---|---|
| 2017/0012692 A1 | 1/2017 | Kim et al. | |
| 2017/0150480 A1 | 5/2017 | Kim et al. | |
| 2017/0195998 A1* | 7/2017 | Zhang | H04B 7/086 |
| 2018/0063855 A1 | 3/2018 | Xu et al. | |

FOREIGN PATENT DOCUMENTS

| | | |
|---|---|---|
| CN | 102833691 A | 12/2012 |
| CN | 105325029 A | 2/2016 |
| CN | 106063148 A | 10/2016 |
| CN | 106105300 A | 11/2016 |
| CN | 106162885 A | 11/2016 |
| CN | 106792775 A | 5/2017 |

(Continued)

OTHER PUBLICATIONS

"Cloud-based control of V2X Sidelink Communication," 5GAA Working Group WG2 meeting, pp. 1-4, 5G Automotive Association, Munich, Germany (Apr. 19, 2017).

(Continued)

*Primary Examiner* — Nghi H Ly
(74) *Attorney, Agent, or Firm* — Leydig, Voit & Mayer, Ltd.

(57) ABSTRACT

A network controller for controlling beamformed signals that are transmitted by a cluster of devices. The network controller is configured to allocate, to each device, a beam index that determines a respective beam reference signal structure to use when transmitting beamformed signals over a sidelink between the devices, and to make the allocation in such a way as to minimise interference between the beamformed signals.

12 Claims, 8 Drawing Sheets

(56) References Cited

FOREIGN PATENT DOCUMENTS

CN         106797242 A     5/2017
WO       2016044994 A1   3/2016

OTHER PUBLICATIONS

"WF on cross link interference mitigation enablers," 3GPP TSG RAN WG1 #88bis Meeting, Spokane, USA, R1-1706222, pp. 1-3, 3rd Generation Partnership Project, Valbonne, France (Apr. 3-7, 2017).
CN/201780093808.0, Office Action/Search Report, dated Nov. 4, 2020.

* cited by examiner

COLLABORATIVE SIDELINK INTERFERENCE MANAGEMENT WITH BEAM SELECTION TECHNIQUE

CROSS-REFERENCE TO RELATED APPLICATIONS

This application is a continuation of International Application No. PCT/EP2017/070357, filed on Aug. 10, 2017, the disclosure of which is hereby incorporated by reference in its entirety.

TECHNICAL FIELD

This invention relates to managing interference among devices in a cluster which communicate with each other via sidelink communication.

BACKGROUND

Vehicle-to-vehicle (V2V) communication is an important part of intelligent transport systems which use the data from vehicles to improve traffic management by allowing vehicles to communicate with each other and with roadside infrastructure, such as traffic lights and signs. By allowing vehicles to provide each other with information, such as safety warnings and traffic information, such systems can be effective in avoiding accidents and traffic congestion.

Long-Term Evolution Vehicle (LTE-V) is a standard which allows communication between vehicles. LTE-V release 14 uses a zone-based resource allocation technique in which device-to-device (D2D) resources are reused based on the location and hence the sidelink interference is minimized. In vehicle-to-vehicle (V2X) sidelink stage 1 and 2 there is also focus on a separate resource pool for mode 3 and 4 and also reusing the same resource pools.

Many of the latest road vehicles are equipped with user equipment devices (UEs) having multiple antennas and hence use beamforming to enhance link reliability. However, this leads to further complications in terms of interference between vehicles with the same or overlapped resources and hence the system capacity is limited.

When there is a high density of vehicles in a space, for example when there is heavy traffic, intra-zone interference may be high. In the case of cooperative group communication, such as clusters, or platooning, interference needs to be managed among base stations.

US 2017/0012692 A1 discloses a system which allocates beam indices to beamformed signals transmitted from a base station.

SUMMARY

There is a need for a method of effectively reducing interference between beamformed signals in clusters of vehicles which communicate with each other by sidelink.

According to a first aspect, a network controller is provided for controlling beamformed signals that are transmitted by a cluster of devices, the network controller being configured to allocate each device a beam index, which determines a respective beam reference signal structure, to use when transmitting beamformed signals over a sidelink between the devices, and to make that allocation in such a way as to minimise interference between the beamformed signals. This provides an effective way of minimising interference.

The network controller may store a map indicating which beam reference signal structure corresponds to which beam index. This may allow the network controller to determine which beam reference signal structure corresponds to which beam index.

The network controller may be configured to control interference between the beamformed signals by allocating each device in the cluster a unique beam index such that each device in the cluster transmits a beamformed signal over the sidelink that has a beam reference signal structure different from the beam reference signal structure of the beamformed signals transmitted over the sidelink by other devices in the cluster. This may allow the beamformed signals to be distinguished from each other.

The network controller may be configured to control interference between the beamformed signals by allocating and deallocating beam indices. The network controller may be configured to control interference between the beamformed signals by associating a beam index with an acceptable transmit power and communicating that acceptable transmit power to the device that is allocated that beam index. These are effective ways of minimising interference.

The network controller may be configured to make the allocation in dependence on information received from one or more of the devices in the cluster about beamformed signals that are transmitted over the sidelink.

Said information may include a strength and/or phase and/or amplitude of a beamformed signal received by a device over the sidelink and the corresponding beam index of that signal.

Some devices in the cluster may be connected to different base stations, the network controller being configured to communicate with one or more of those base stations about the allocation of beam indices. This may allow information to be shared from multiple base stations.

The network controller may be configured to communicate the allocation of beam indices to devices in the cluster. The network controller may be configured to allocate the beam indices in dependence on information received from the one or more other base stations. This may allow the maintenance of unique beam indices for cooperative beam selection in a cluster to minimize interference.

The network controller may be configured to reallocate the beam indices when a new device joins the cluster. The network controller may do this in such a way that each beam in the cluster has a unique index. This may allow interference management when devices move from one cluster to another.

The network controller may be one of: a base station, a device that is part of the cluster and a cloud server. The cloud server may manage radio resource management for sidelink. The technique is thus suitable for a number of different architectures.

According to a second aspect, a method is provided for controlling beamformed signals that are transmitted by a cluster of devices, the method comprising allocating each device a beam index, which determines a respective beam reference signal structure, to use when transmitting beamformed signals over a sidelink between the devices, and making that allocation in such a way as to minimise interference between the beamformed signals.

According to a third aspect, a device is provided for forming part of a cluster of devices that are configured to communicate with each other via a sidelink, the device being configured to: receive a beam index from a network controller; form a beamformed signal to have a structure that is determined by that beam index; and transmit the beamformed signal over the sidelink.

The device may be configured to: determine the beam index of a signal received over the sidelink; determine a strength of the beamformed signal; and transmit an indication of the beam index and strength of the beamformed signal to the network controller. The device may also determine the phase and/or amplitude of the beamformed signal and transmit an indication of the phase and/or amplitude of the beamformed signal to the network controller.

According to fourth aspect, a method is provided for a cluster of devices to communicate with each other via a sidelink, the method comprising: receiving a beam index from a network controller; forming a beamformed signal to have a structure that is determined by that beam index; and transmitting the beamformed signal over the sidelink.

The device may store a map indicating which beam reference signal structure corresponds to which beam index. This may allow the device to determine which beam reference signal structure corresponds to which beam index.

BRIEF DESCRIPTION OF DRAWINGS

The present invention will now be described by way of example with reference to the accompanying drawings. In the drawings.

DESCRIPTION OF EMBODIMENTS

Figure 1:
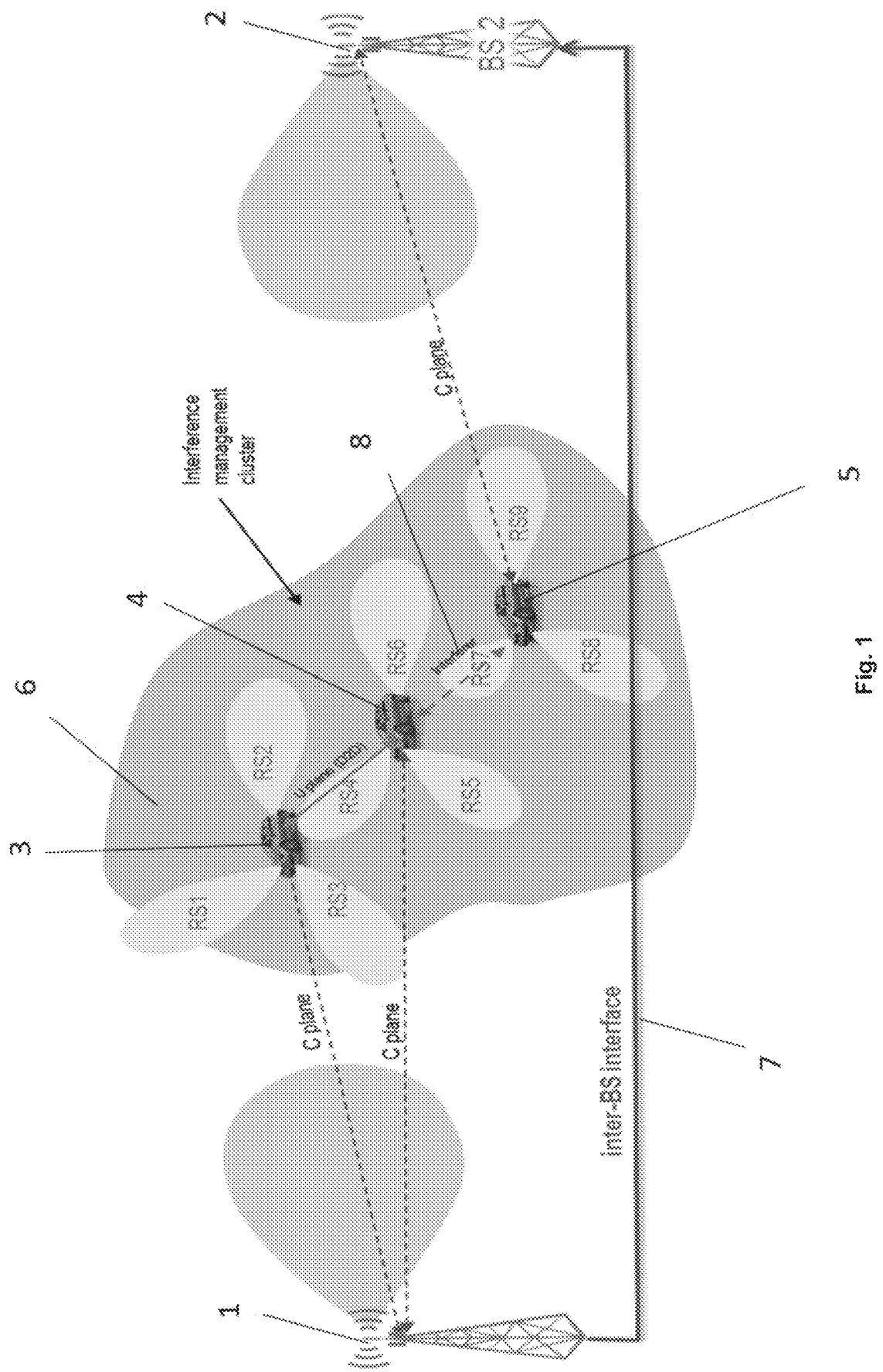
FIG. 1 shows three UEs in a cluster which communicate with one of two different base stations.

Illustrated in FIG. 1 are three vehicles which each comprise a user equipment device (UE) 3, 4, 5. The vehicles are grouped into a cluster 6. The primary communication channel of each UE is to one of base stations 1 and 2, but the UEs are also able to communicate directly with each other by transmitting and receiving beamformed signals by sidelink. UEs 3 and 4 in the cluster 6 communicate with base station 1. UE 5 communicates with base station 2. The base stations communicate with each other via an inter-base station interface 7. There is an area of interference 8 between the beamformed signals of UE 4 and UE 5.

Figure 2:
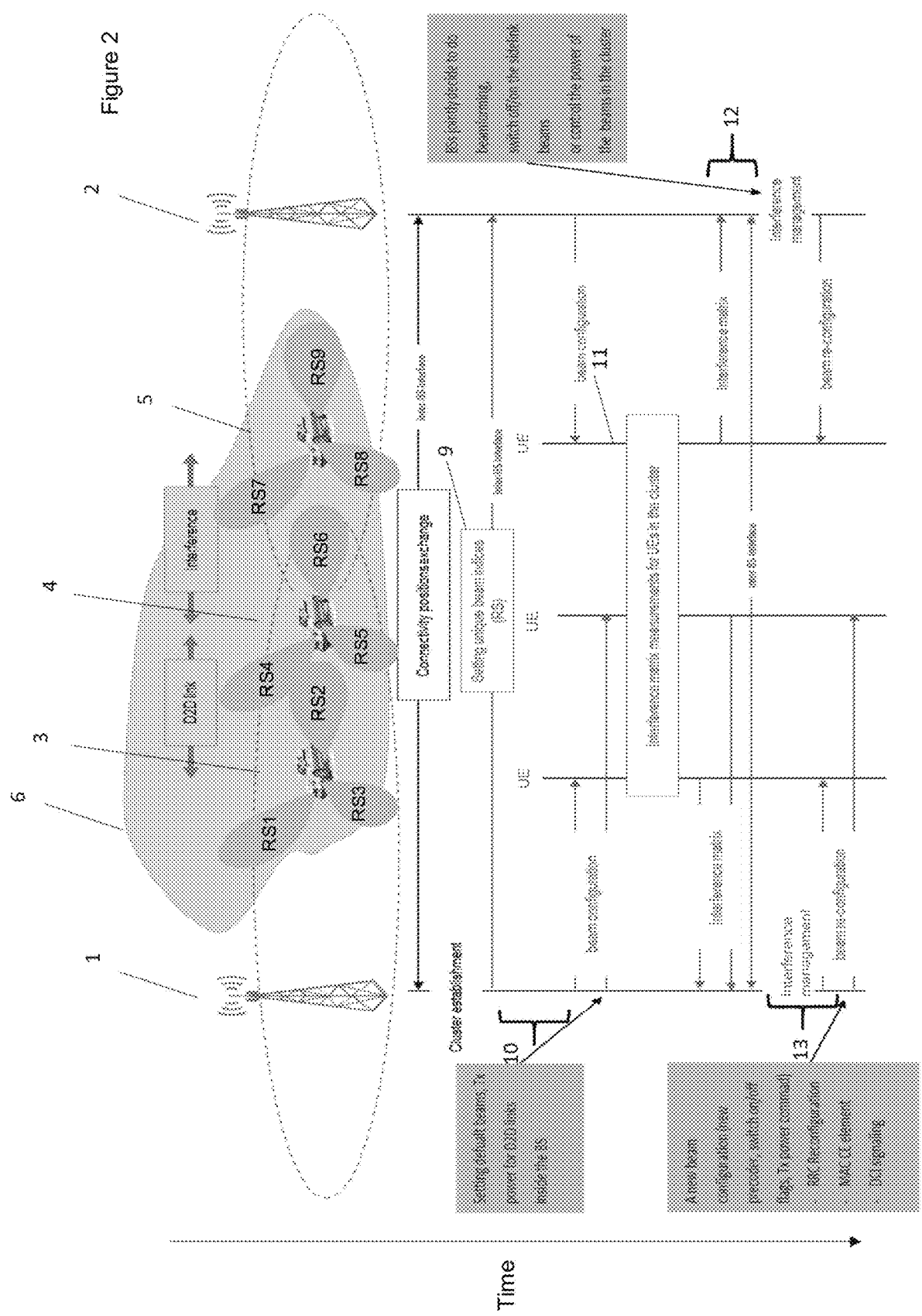
FIG. 2 illustrates the processes carried out for interference minimisation for the arrangement of FIG. 1.

FIG. 2 further illustrates the scenario where there are two base stations and three UEs and shows the signals exchanged between the base stations and the three UEs at the bottom of the figure.

The approach first assumes that the cluster is established and the UEs are synchronized and in connected mode.

Unique beam indices RS1-RS9 are set for the devices in the cluster, as shown at 9 in FIG. 2. Base station 1 allocates devices 3 and 4 in the cluster a unique beam index (for example, for the reference signal) for beamformed signals transmitted and received by sidelink in the cluster. Base station 2, which is attached to device 5, allocates device 5 a unique beam index. The reference signal (RS) may, for example, be a beam specific reference signal or channel state information reference signal (CSI-RS). The unique reference signal structure for each beam helps each UE to measure different beams belonging to other UEs in a cluster. These unique reference signal structures are shown as RS1-RS9 in FIGS. 1 and 2. RS1-RS3 are associated with UE 3, RS4-RS6 are associated with UE 4 and RS7-RS9 are associated with UE 5.

By allocating each device a unique beam index, each device in the cluster transmits a beamformed signal over the sidelink that has a beam reference structure different from the beam reference structure of the beamformed signals transmitted over the sidelink by other UE devices in the cluster.

In order to maintain unique beam indices for cooperative beam grouping in a cluster with the help of the base station, information regarding the sidelink beam indices for a particular device attached to a base station is forwarded to the neighboring base stations that share the same cluster via inter-base station interface 7. This allows the beam indices to be adjusted in the neighboring base station, such that unique beam indices are maintained in the cluster of UEs connected among base stations 1 and 2.

The default beams and transmit power for the D2D links are then set inside the base stations, as shown at 10 in FIG. 2.

Sidelink interference matrix measurements are then performed for the UEs in the cluster, as shown at 11.

Sidelink interference matrix measurements performed by the UEs in the cluster are then reported to the base stations along with the beam indices, so that the base stations know the beam indices that are responsible for creating the interference. In FIG. 2, this is the beam RS7.

In order to minimize interference and enhance the desired vehicle-to-vehicle links among the cluster or to other clusters, the base stations may jointly perform interference management, shown at 12 in FIG. 2. This results in re-configuration of the beams, shown at 13.

Interference may be reduced by adjusting the beam configuration. This may include beamforming, or switching on/off the sidelink beams. A UE can measure the beams of other UEs and send the interference matrix, including phase and amplitude for each strongest beam from other UEs in a cluster, back to the base station along with the beam indices. The base station then decides to switch on/off the corresponding sidelink transmit beams causing interference. Knowing the phases and amplitudes of all beams would be equivalent to perfect CSI (assuming orthogonal discrete Fourier transform (DFT) beams).

Alternatively or additionally, interference reduction may be achieved by controlling the power of beams in the cluster. Each vehicle can estimate the signal-to-noise ratio (SNR) over each possible received beam. The beams are chosen that have the highest estimated SNR. The SNR is then sent to the base stations. The base stations compute the required transmit powers and send power control signals to the UEs at the vehicles.

A base station may be configured to control interference between the beamformed signals by associating a beam index with an acceptable transmit power and communicating that acceptable transmit power to the UE device that is allocated that beam index.

Figure 3:
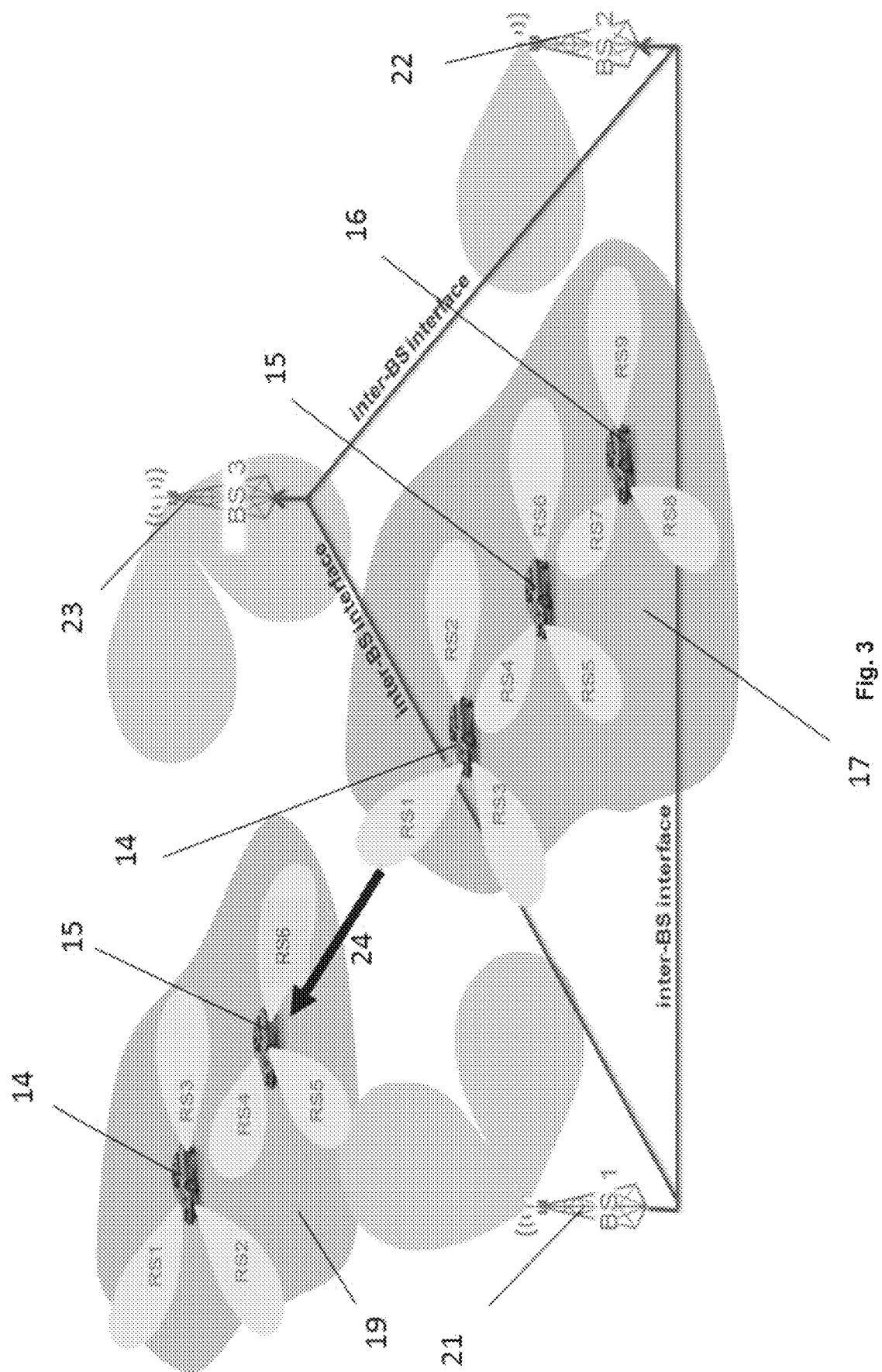
FIG. 3 shows a UE moving from one cluster to another.

In one embodiment, the beam indices could be re-configured when a UE moves from one cluster to another cluster. This is illustrated in FIG. 3. Three UEs 14, 15, and 16 are in a cluster 17. The UEs 14, 15, 16 are attached to one of base stations 21, 22 and 23. UEs 14 and 15 then move from cluster 17 to cluster 19, as indicated by arrow 24. The UEs 14 and 15 in this cluster 19 are attached to one of base stations 21 and 23. Two or more clusters can reuse the beam indices as shown in FIG. 3. Base stations with a joint cluster take care of assigning new beam indices when a new UE enters the cluster. The base stations maintain the list of UEs (beam indices) in a cluster and exchange this information.

Figure 4:
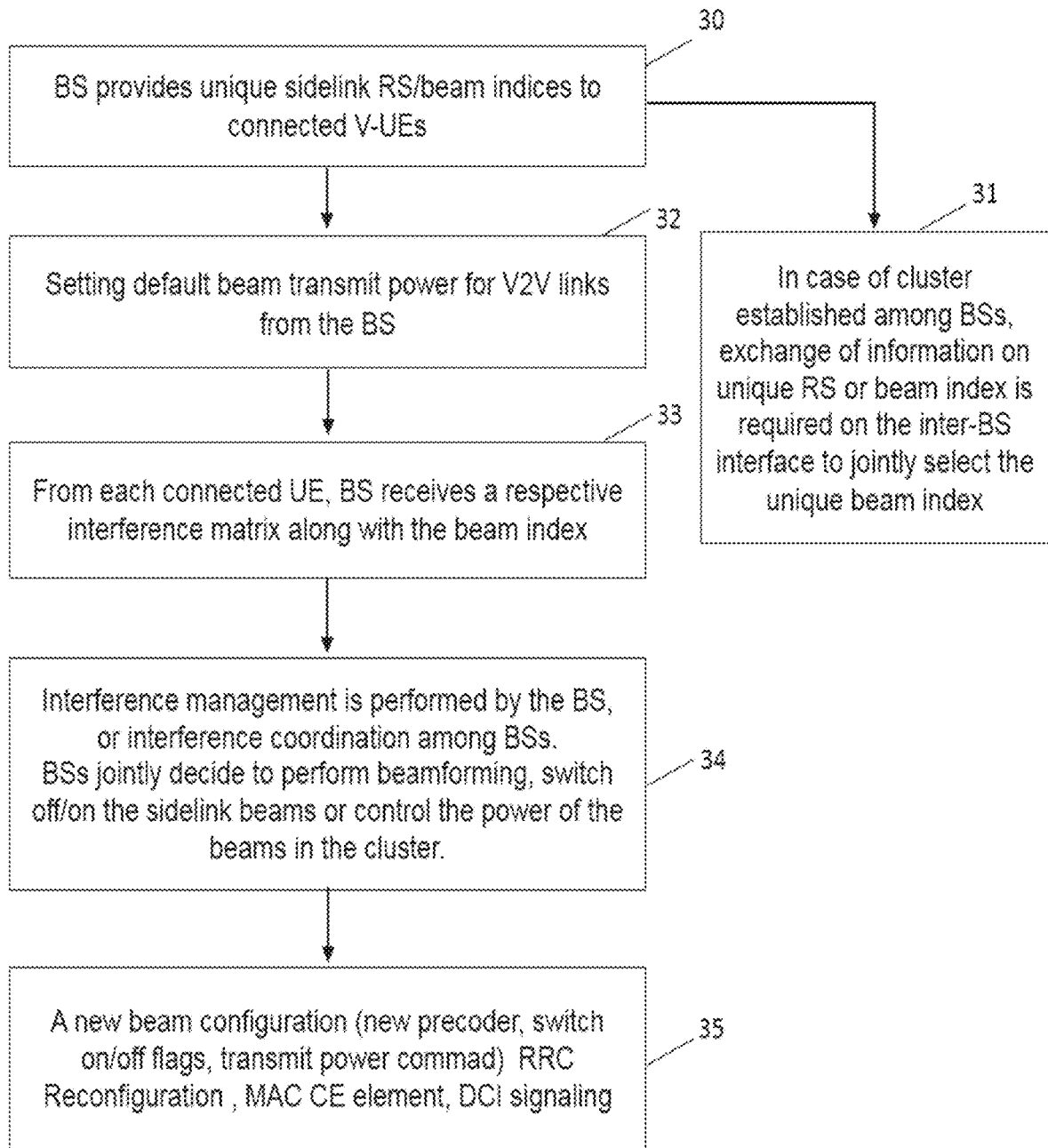
FIG. 4 shows the processing operations carried out at the base station.
Figure 5:
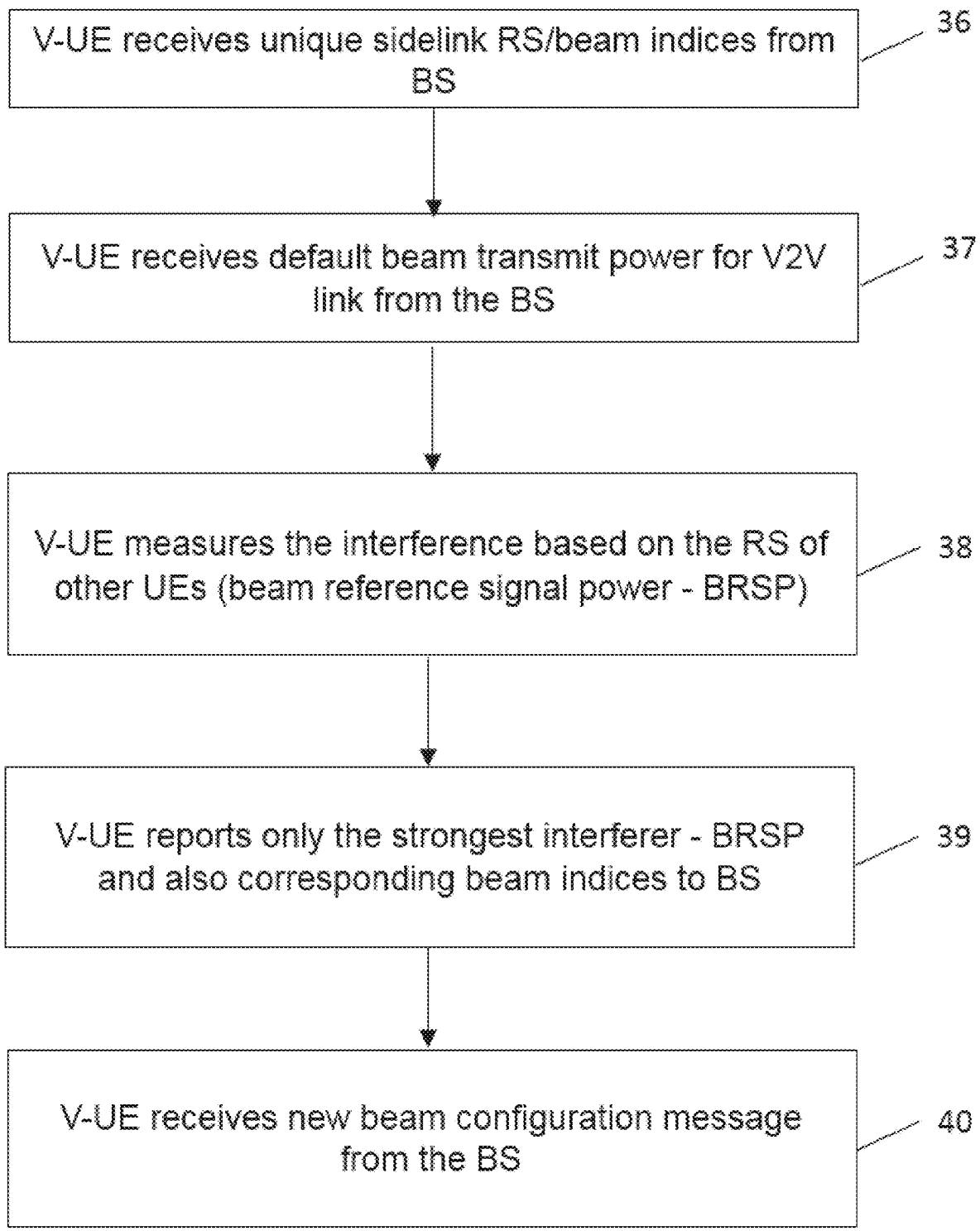
FIG. 5 shows the processing operations carried out at the UE device.

FIGS. 4 and 5 show the operations carried out at the base station and the UE respectively.

As illustrated in FIG. 4, in a first step 30 a base station provides a unique sidelink reference signal, or unique beam indices, to each beamformed signal of each UE of a cluster of connected vehicle user equipment devices (V-UEs). In the case of a cluster established among multiple base stations, information regarding the unique reference signals or beam indices is exchanged on the inter-base station interface to jointly select the unique beam index, shown at 31.

The default beam transmit power for the vehicle-to-vehicle (V2V) link is then set from the base station in step 32.

From each connected UE, the base station then receives a respective interference matrix along with the beam index in step 33. The base station then carries out interference management, or interference coordination is carried out among the base stations in step 34. In this step, the base stations may jointly decide to perform beamforming, switch off/on the sidelink beams or control the power of the beams in the cluster.

In step 35 the new beam configuration is established. This may include establishing a new precoder, switching on/off flags, and/or transmitting power commands. This may include radio resource control (RRC) Reconfiguration, media access control (MAC) control element (CE) or downlink control information (DCI) signaling.

The operations performed at the V-UE are shown in the flowchart of FIG. 5. The UE receives unique sidelink reference signal or beam interface indices from the base station in step 36. The UE receives default beam transmit power for the V2V link from the base station in step 37. The V-UE then measures the interference based on the reference signal of other UEs, e.g. beam reference signal power (BRSP), in step 38. The V-UE reports only the strongest interferer, BRSP and also the corresponding beam indices to the base station in step 39. The V-UE then receives the new beam configuration message from the base station in step 40.

Figure 6:
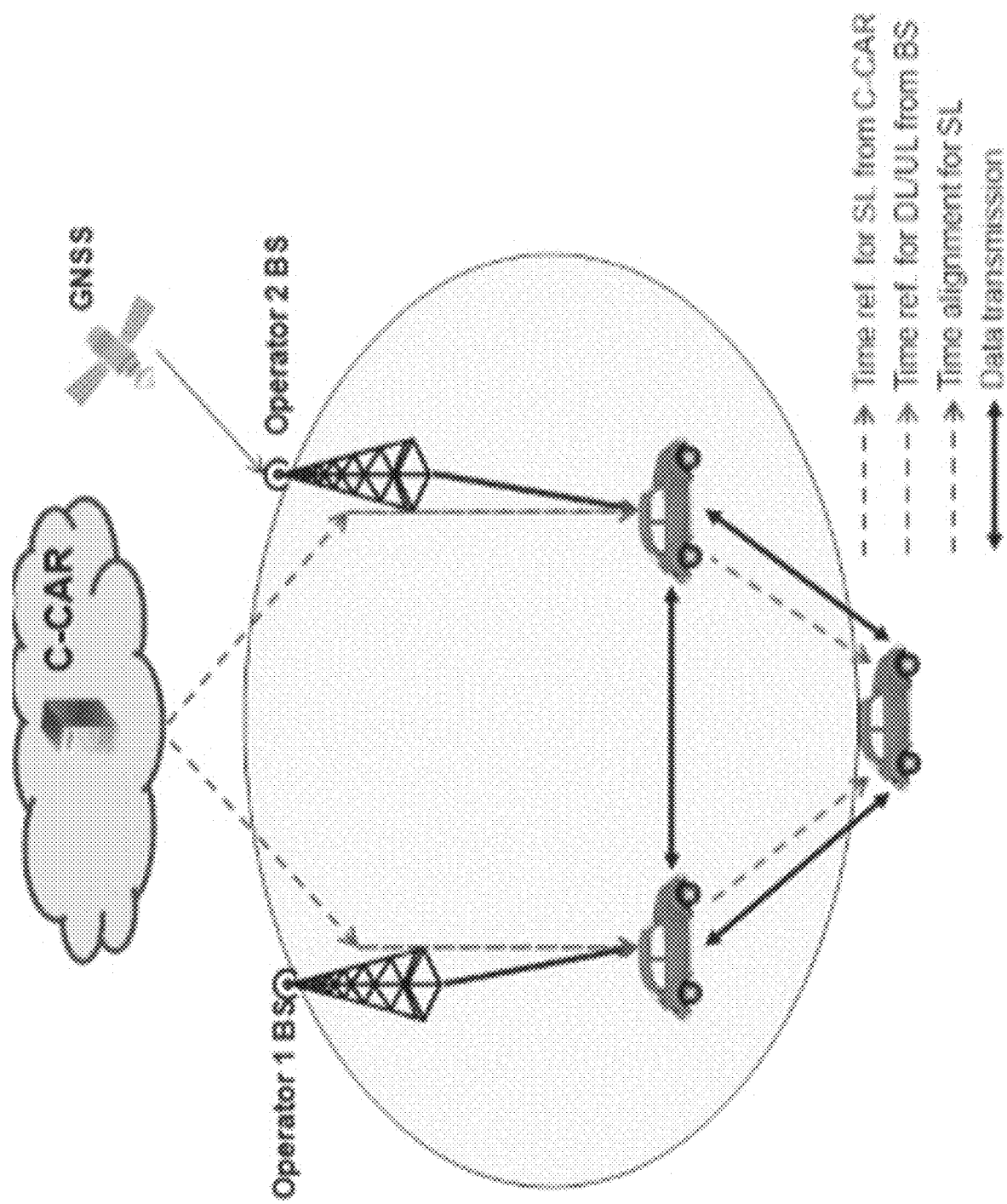
FIGS. 6 and 7 illustrate the use of the technique with processing carried out in a cloud.
Figure 7:
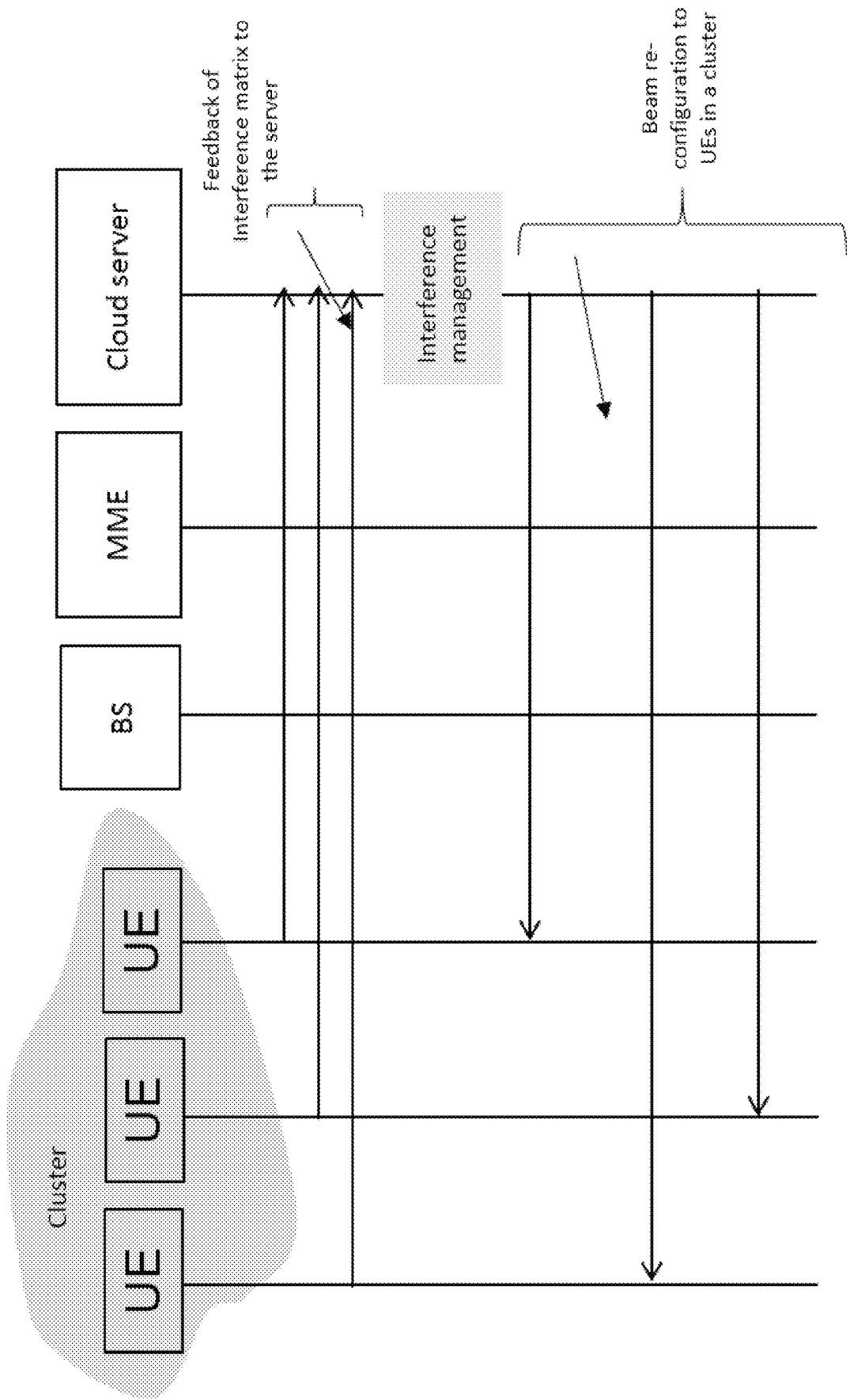

Since the interference management happens in the sidelink with information coordination among base stations, this method of interference management is also suitable for UEs with different mobile network operators (MNOs) with the help of a cloud server, as illustrated in FIGS. 6 and 7.

In this embodiment, sidelink radio resource management (RRM) is managed centrally in a cloud server 41. The cloud server may be operator-independent and in this case the operator acts as a transparent bit pipe.

This embodiment assumes that the cluster is established, the UEs are synchronized and in connected mode with different mobile network operators (MNOs), and all UEs in the cluster are connected to cloud server 41. The cloud server provides new beam indices for a new UE entering a cluster. The cloud server maintains the list of UEs in a cluster and manages interference both within and among clusters by switching off/on beams, or transmit power control.

The cloud-server can therefore perform all RRC and/or MAC functions related to V2X sidelink communication. Standard RRC/MAC control signaling messages related to V2X sidelink communication are IP encapsulated/decapsulated and transmitted/received to/from the UE. This has the benefit of not requiring a bilateral agreement between the Public Land Mobile Network (PLMN) and the cloud-server provider.

All RRC/MAC functions related to V2X sidelink communication are moved from the PLMN operator (base station) to the cloud-server. The cloud-server can make use of the PLMN's radio interface to the UE in order to establish an IP communication link with the UE to exchange standard RRC/MAC control signaling messages.

Using the described methods of beam grouping in a cluster with unique indices, as exemplified by the above embodiments, and transferring the amplitude and phase of the orthogonal beams, improved interference management can be achieved.

By coordinating between base stations to manage interference among UEs by dynamic beam configuration, sidelink reliability and system capacity are enhanced. This technique results in better handling of UEs leaving and joining different clusters and uses minimum feedback (phase and amplitude information) of the UEs in a cluster instead of a complete knowledge of channel state information (CSI). Knowing the phases and amplitudes of all beams would be equivalent to perfect CSI (assuming orthogonal discrete Fourier transform (DFT) beams).

Figure 8:
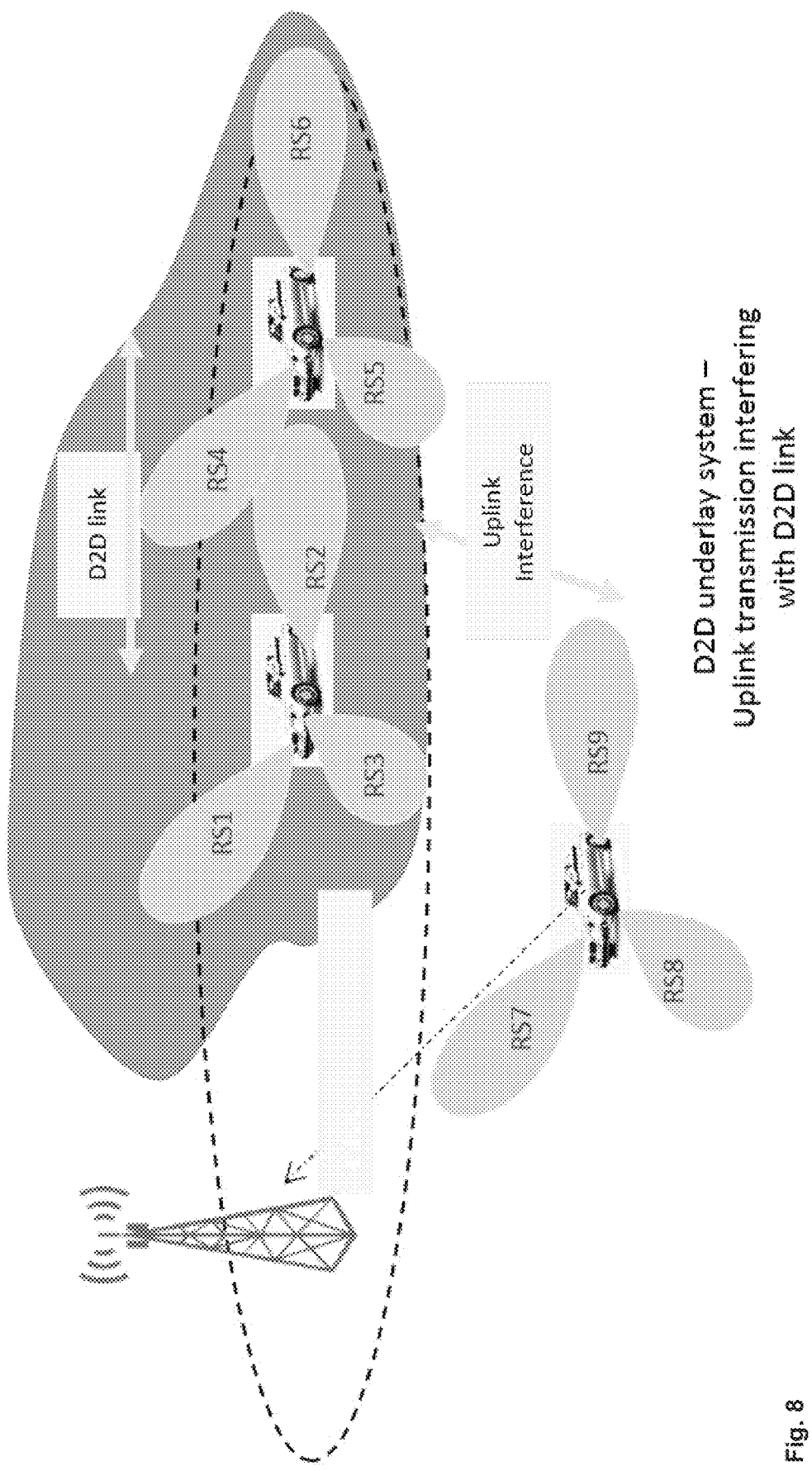
FIG. 8 illustrates the use of the technique in a V2V underlay system.

In the case of D2D or V2V underlay communication, where the sidelink frequency is reusing one of the uplink frequencies used by the Uu plane for cellular uplink communication, the radio resource management needs to carefully handle uplink interference in V2V or D2D links. Hence the above method of assigning beam indices for uplink could be helpful for measuring and reporting the uplink interferer beam index and strength to the base station (described in Distributed Resource Management for Device-to-Device (D2D) Communication Underlay Cellular Networks, 2013 IEEE 24th International Symposium on Personal Indoor and Mobile Radio Communications (PIMRC), Issue Date: 8-11 Sep. 2013) for coordinating interference management, as illustrated in FIG. 8.

Instead of being managed by a base station, beam configuration management could also be handled by a super UE, a cluster head or a platoon head.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A network controller for controlling beamformed signals that are transmitted by a cluster of devices, the network controller comprising:
    a processor, configured to:
        allocate a beam index to each device in the cluster of devices, wherein each respective beam index determines a respective beam reference signal structure to use when transmitting beamformed signals over a sidelink, wherein the allocation of beam indices is made in such a way as to limit interference between the beamformed signals, and wherein the processor is configured to control interference between the beamformed signals by allocating, to each respective device in the cluster of devices, a unique beam index such that each respective device in the cluster of devices transmits a respective beamformed signal over the sidelink that has a respective beam reference signal structure different from beam reference signal structures of beamformed signals transmitted over the sidelink by other devices in the cluster.

2. The network controller as claimed in claim 1, wherein the processor is configured to control interference between the beamformed signals by allocating and deallocating beam indices.

3. The network controller as claimed in claim 1, wherein the processor is configured to control interference between the beamformed signals by associating a respective beam index with an acceptable transmit power and by communicating the respective acceptable transmit power to a respective device to which the respective beam index is allocated.

4. The network controller as claimed in claim 1, wherein the allocation of beam indices is made in dependence on information received from one or more of the devices in the cluster about beamformed signals that are transmitted over the sidelink.

5. The network controller as claimed in claim 4, wherein the information includes a strength of a respective beamformed signal received by a respective device over the sidelink and a respective corresponding beam index of the respective beamformed signal.

6. The network controller as claimed in claim 1, wherein some devices in the cluster are connected to base stations, and wherein the processor is configured to communicate with one or more of the base stations about the allocation of beam indices.

7. The network controller as claimed in claim 6, wherein the processor is configured to communicate the allocation of beam indices to devices in the cluster.

8. The network controller as claimed in claim 6, wherein the processor is configured to allocate the beam indices in dependence on information received from the one or more different base stations.

9. The network controller as claimed in claim 1, wherein the processor is configured to reallocate beam indices when a new device joins the cluster.

10. The network controller as claimed in claim 1, wherein the processor is located at one of the group consisting of: a base station, a device that is part of the cluster, and a cloud server.

11. The network controller as claimed in claim 1, wherein interference between the beamformed signals is limited by performing, by the processor:
    receiving, from each of one or more respective devices in the cluster of devices, a respective interference matrix including measurements of beams of other devices in the cluster of devices; and
    deciding to switch on and/or off sidelink transmit beams causing interference.

12. A method for controlling beamformed signals that are transmitted by a cluster of devices, the method comprising:
    allocating a beam index to each device in the cluster of devices, wherein each respective beam index determines a respective beam reference signal structure to use when transmitting beamformed signals over a sidelink,
    wherein the allocation of beam indices is made in such a way as to limit interference between the beamformed signals, and
    wherein the interference between the beamformed signals is controlled by allocating, to each device in the cluster of devices, a unique beam index such that each respective device in the cluster of devices transmits a respective beamformed signal over the sidelink that has a respective beam reference signal structure different from beam reference signal structures of beamformed signals transmitted over the sidelink by other devices in the cluster.

* * * * *